US011467659B2

(12) United States Patent
Bikumandla et al.

(10) Patent No.: US 11,467,659 B2
(45) Date of Patent: Oct. 11, 2022

(54) SYSTEMS AND METHODS FOR FACIAL EXPRESSION TRACKING

(71) Applicant: Meta Platforms Technologies, LLC, Menlo Park, CA (US)

(72) Inventors: Manoj Bikumandla, Union City, CA (US); Chao Han, Pleasanton, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 246 days.

(21) Appl. No.: 16/746,226

(22) Filed: Jan. 17, 2020

(65) Prior Publication Data

US 2021/0223856 A1 Jul. 22, 2021

(51) Int. Cl.

| | |
|---|---|
| ***G06F 3/01*** | (2006.01) |
| ***G01S 17/89*** | (2020.01) |
| ***G06V 40/16*** | (2022.01) |

(52) U.S. Cl.
CPC .............. *G06F 3/012* (2013.01); *G01S 17/89* (2013.01); *G06V 40/174* (2022.01)

(58) Field of Classification Search
CPC ....... G06F 3/012; G01S 17/89; G06V 40/174; G06V 10/145; G06V 40/166
See application file for complete search history.

(56) References Cited

U.S. PATENT DOCUMENTS

| | | | | |
|---|---|---|---|---|
| 2018/0060651 A1* | 3/2018 | Kim | ..................... | G06V 40/166 |
| 2018/0107275 A1* | 4/2018 | Chen | ....................... | G06F 3/015 |
| 2018/0149864 A1* | 5/2018 | Gibbs | .................... | G06V 40/16 |

FOREIGN PATENT DOCUMENTS

WO WO-2016/165052 A1 10/2016

OTHER PUBLICATIONS

Expression Recognition in Daily Life by Embedded Photo Reflective Sensors on Smart Eyewear, Intelligent User Interfaces, ACM, Mar. 7, 2016 (Mar. 7, 2016), pp. 317-326.
International Search Report and Written Opinion on PCT/US2021/012971 dated May 3, 2021 (13 pages).
Suzuki Katsuhiro et al: "Recognition and mapping of facial expressions to avatar by embedded photo reflective sensors in head mounted display", 2017 IEEE Virtual Reality (VR),Mar. 18, 2017 (Mar. 18, 2017), pp. 177-185.

* cited by examiner

*Primary Examiner* — Phuong H Nguyen
(74) *Attorney, Agent, or Firm* — Foley & Lardner LLP

(57) ABSTRACT

A facial tracking device including an illuminator and a photon detector. The illuminator configured to project a light toward a first portion of a head of a user and the photon detector configured to detect light reflected from a second portion of the head of the user. The facial tracking device further including a processor that is connected to the illuminator and photon detector and configured to cause the illuminator to project the light toward the head of the user, receive information from the photon detector, and determine a facial expression of the user.

20 Claims, 12 Drawing Sheets

SYSTEMS AND METHODS FOR FACIAL EXPRESSION TRACKING

FIELD OF THE DISCLOSURE

The present disclosure relates generally to a facial tracking system. More particularly, the present disclosure relates to systems and methods tracking facial expressions.

BACKGROUND

The present disclosure relates generally to facial tracking systems. Facial tracking systems or devices may be utilized in a variety of electronic devices. For example, a facial tracking system may be utilized to determine a facial expression on a face of a user of a virtual reality (VR), augmented reality (AR), or mixed reality (MR) system.

SUMMARY

The subject matter of this disclosure is directed to systems and methods for facial expression tracking. In some embodiments, the system includes an illuminator, a single or group of photon detectors, one or more analog circuits, and/or a software algorithm to reconstruct facial expressions based on the information from the photon detectors. In some embodiments, the photon detectors and/or the illuminators do not require lenses. The system provides a low cost, low computational overhead facial recognition system that does not require cameras or complex image data processing in some embodiments.

One implementation of the present disclosure is related to a wearable display (e.g. a head mounted (HMD)), according to some embodiments. The wearable display may include an element configured to be worn on a head of a user, an illuminator disposed with the element and configured to emit light toward at least a portion of the head, a photon detector disposed with the element and configured to receive light reflected from at least a second portion of the head, and one or more processors coupled to a non-transitory computer-readable storage medium having instructions encoded thereon that, when executed by the one or more processors, cause the one or more processors to cause the illuminator to project the light toward the portion of the head, receive information from the photon detector, and determine a facial expression of the user based at least on the information from the photon detector. In some embodiments, the element is a glass frame and/or a housing.

In another implementation, a facial tracking system includes an illuminator configured to emit light toward at least a portion of a face of a user, a photon detector configured to receive light reflected from at least a second portion of the face, and a processor. The processor is configured to receive information regarding the characteristics of light detected by the photon detector, and determine a facial expression of the face based on the characteristics of light detected by the photon detector.

In another implementation, a method of facial tracking includes projecting light using an illuminator of a facial tracking system toward a face of a user, receiving, at the processor, information from a photon detector, the information comprising characteristics of the light reflected from the face, and determining, via the processor, a facial expression of the face based on the information from the photon detector.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Referring generally to the FIGURES, systems and methods for a facial tracking systems are shown, according to some embodiments. The facial tracking system includes a facial tracking circuit. The facial tracking circuit includes an illuminator and a photon detector. In some embodiments, the facial tracking circuit includes two or more illuminators or photon detectors. In some embodiments, the facial tracking system includes a first facial tracking circuit positioned to monitor a first portion of a face of a user and facial tracking circuit positioned to monitor a second portion of the face of the user. In some embodiments, the facial tracking system may include additional facial tracking circuits, each configured to monitor respective portions of the face of the user. In some embodiments, a first illuminator is configured to project a light toward a first portion of the face (e.g., a right side of a mouth of the user) of a user and a first detector is configured to receive the light reflected from the first portion of the face and a second illuminator is configured to project a second light toward a second portion of the face of the user (e.g., a left side of a mouth of the user) and a second detector is configured to receive the second light reflected from the second portion of the face. The light received at the first detector and the second light received at the second detector may then be used to determine a distance that the respective portions of the face are from the detector. The facial tracking system may then determine that the user is making a facial expression (e.g., a smile, frown, excitement, surprise, etc.) based on the known portions of the face that the first and second detectors are receiving the respective light from. In this way, the facial tracking system may track the facial expressions of a user with one or more illuminators and photon detectors, which may reduce the facial tracking system's processing requirements and/or footprint. In other words, the facial tracking system provides for a low cost, low computational overhead facial recognition system that does not require cameras or complex image data processing.

In some embodiments, the facial tracking system may be implemented in various form factors. For example, the facial tracking system may be implemented in the form of worn device such as a head mountable device or other device that is positioned to monitor a face of a user. In some embodiments, the worn device may include glasses, goggles, or other head wearable device. Further, the facial tracking system may be implemented or connectable to various electronic devices. For example, the facial tracking system may be implemented with a virtual reality (VR) system, augmented reality (AR) system, or mixed reality (MR) system. In some embodiments, the facial tracking system may be implemented with electronic devices such as game consoles, server systems, personal computers, or gaming systems.

Figure 1:
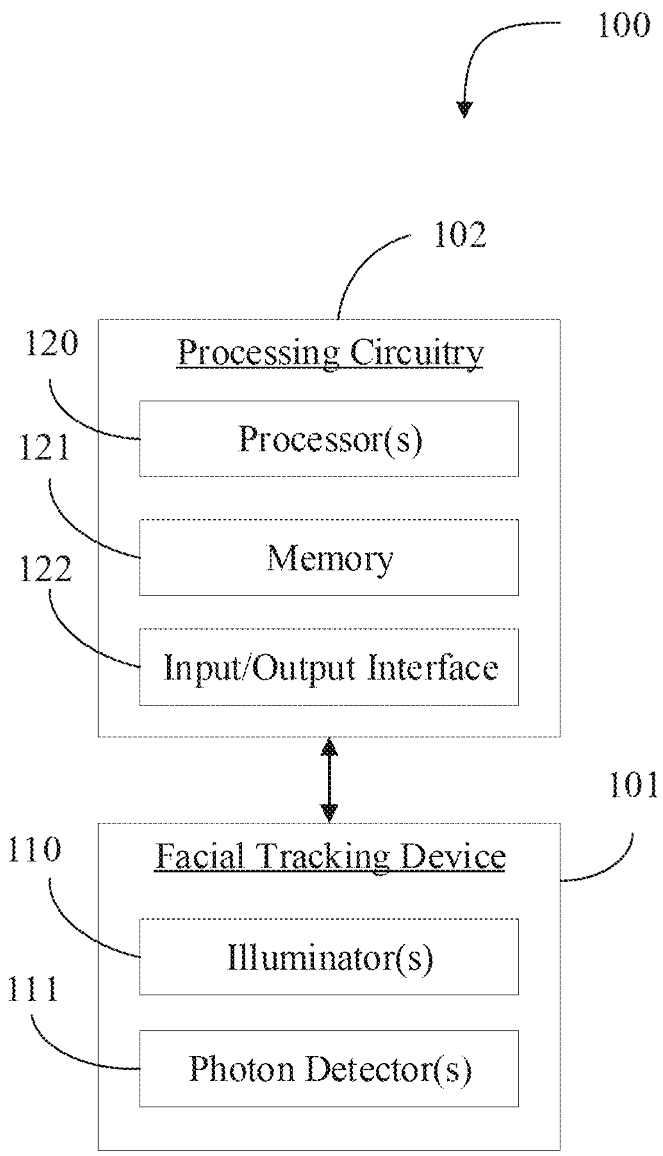
FIG. 1 is a block diagram of a facial tracking system in accordance with an illustrative embodiment.

Referring now to FIG. 1, a block diagram of a facial tracking system 100 is shown. The facial tracking system 100 may include a facial tracking device 101, and processing circuitry 102. The facial tracking device 101 includes an illuminator 110 and a photon detector 111. In some embodiments, the facial tracking device 101 may include two or more illuminators 110 and/or two or more photon detectors 111. In some embodiments, the illuminator 110 may include an infrared illuminator, diode, light emitting diode (LED), lamp, laser, a combination thereof, or other illumination sources. Additionally, the photon detector 111 may include photoconductive detectors, photovoltaic detectors, p-n junction photovoltaic detectors, p-i-n photodiodes, avalanche photodiodes (APD), Schottky photodiodes, photo-electromagnetic (PEM) detectors, quantum well infrared photodetectors (QWIP), a combination thereof, or other types of photon detectors. The illuminator 110 is positioned or arranged to project a light toward a first portion of a face of a user, and the photon detector 111 is positioned or arranged to receive light reflected from the first portion of the face of the user. In this way, the facial tracking system 100 may monitor movements and/or detect positions of objects within the first portion. In some embodiments, the facial tracking system 100 and/or facial tracking device 101 is part of a game console, a VR, AR, or MR console, or a wearable display.

The processing circuitry 102 may include a processor 120, a memory 121, and an input/output interface 122. In some embodiments the processing circuitry 102 may be integrated with various electronic devices. For example, in some embodiments, the processing circuitry 102 may be integrated with a wearable device such as a head worn display, smart watch, wearable goggles, or wearable glasses. In some embodiments, the processing circuitry 102 may be integrated with a gaming console, personal computer, server system, or other computational device. In some embodiments, the processing circuitry 102 may also include one or more processors, application specific integrated circuit (ASICs), or circuitry (e.g., such as winner take all circuitry) that are integrated with the facial tracking device 101 and are designed to cause or assist with the facial tracking system 100 in performing any of the steps, operations, processes, or methods described herein.

The processing circuitry 102 may include one or more circuits, processors 120, and/or hardware components. The processing circuitry 102 may implement any logic, functions or instructions to perform any of the operations described herein. The processing circuitry 102 can include memory 121 of any type and form that is configured to store executable instructions that are executable by any of the circuits, processors or hardware components. The executable instructions may be of any type including applications, programs, services, tasks, scripts, libraries processes and/or firmware. In some embodiments, the memory 121 may include a non-transitory computable readable medium that is coupled to the processor 120 and stores one or more executable instructions that are configured to cause, when executed by the processor 120, the processor 120 to perform or implement any of the steps, operations, processes, or methods described herein. In some embodiments, the memory 121 is configured to also store, within a database, information regarding the type, form, or characteristics of the light that each illuminator 110 is able to or configured to emit and the positions, portions, or objects that each photon detector 111 is configured to or arranged to monitor or detect. The processing circuitry 102 can include converters, signal processing circuits, filters, and other interface elements in the analog domain and/or the digital domain.

In some embodiments, input/output interface 122 of the processing circuitry 102 is configured to allow the processing circuitry 102 to communicate with the facial tracking device 101 and other devices. In some embodiments, the input/output interface 122 may be configured to allow for a physical connection (e.g., wired or other physical electrical connection) between the processing circuitry 102 and the facial tracking device 101. In some embodiments, the input/output interface 122 may include a wireless interface that is configured to allow wireless communication between the facial tracking device 101 (e.g., an ASIC, integrated circuit (IC), or processor on the facial tracking device 101 connected to the illuminator 110 and the photon detector 111) and the processing circuitry 102. The wireless communication may include a Bluetooth, wireless local area network (WLAN) connection, radio frequency identification (RFID) connection, or other types of wireless connections. In some embodiments, the input/output interface 122 also allows the processing circuitry 102 to connect to the internet (e.g., either via a wired or wireless connection). In some embodiments, the input/output interface 122 also allows the processing circuitry 102 to connect to other devices such as a display, audio system, multiple facial tracking devices 101, or other devices.

It should be noted that various other components can be included in the facial tracking system 100 that are not shown for sake of clarity of the present embodiments. These can include various power and/or signal conditioning components such as analog to digital converters, multiplexers, transistors, etc. Such additional components can be included in either the facial tracking device 101 or the processing circuitry 102 as appropriate for the particular embodiment.

Figure 2:
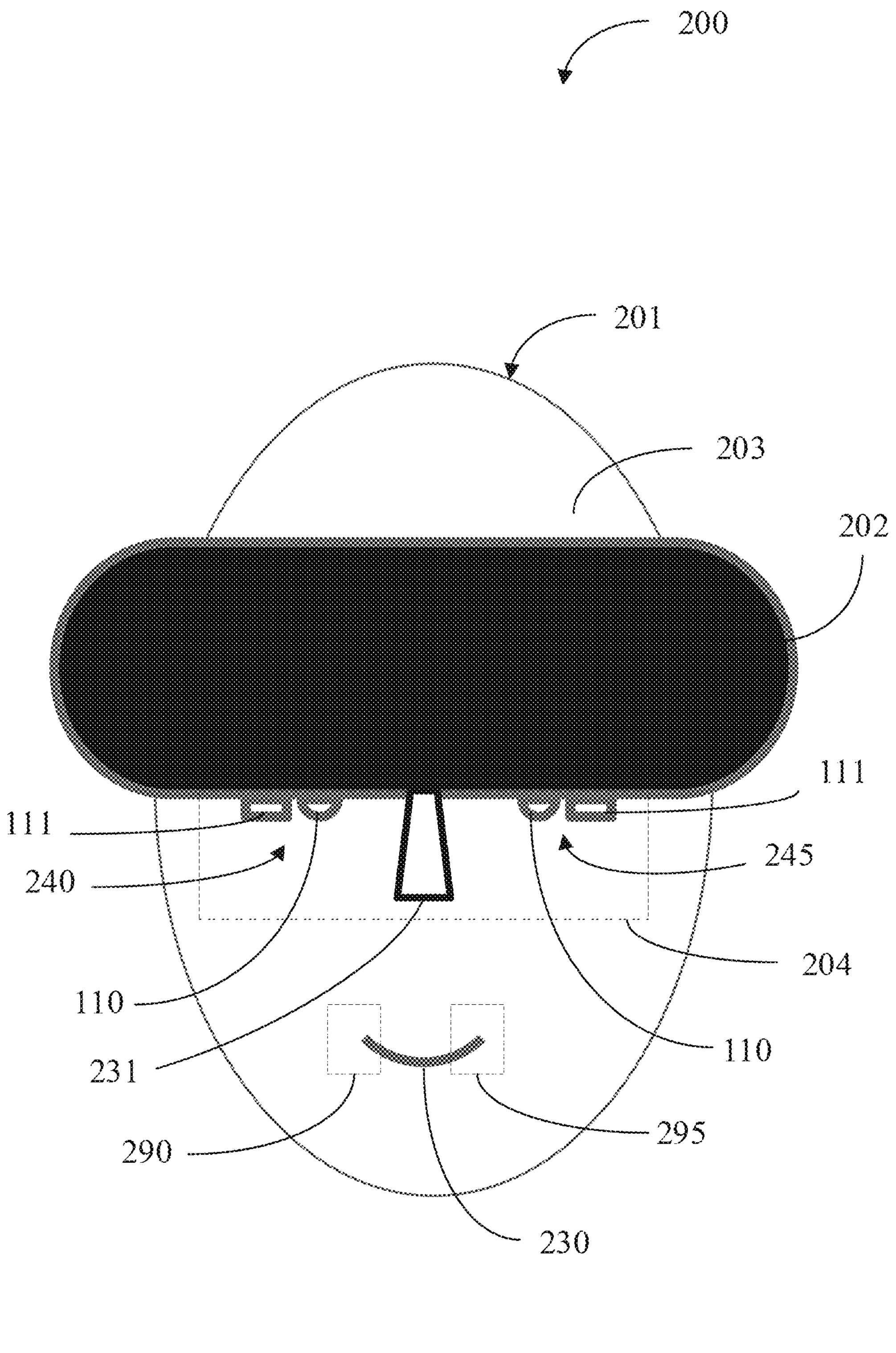
FIG. 2 is a view of a user wearing a head mountable device integrated with a facial tracking system is shown in accordance with an illustrative embodiment.

Referring now to FIG. 2, a view 200 of a user wearing a head mountable device integrated with a facial tracking system is shown. The view 200 depicts a user 201 having a wearable device 202 (e.g., a head mounted devise affixed to a head 203 of the user). The wearable device 202 includes a facial tracking system 204. The facial tracking system 204 may be similar to, or implemented as, the facial tracking system 100 described in reference to FIG. 1.

The facial tracking system 204 includes a first facial tracking device 240 and a second facial tracking device 245. The first facial tracking device 240 is positioned or arranged on or within the wearable device 202 such that the first facial tracking device 240 is configured to monitor or detect movements or positions of objects (e.g., a right side of a mouth 230 of the user 201) within, at, or along a first portion 290 of the head 203. Additionally, the second facial tracking device 245 is positioned or arranged on or within the wearable device 202 such that the second facial tracking device 245 is configured to monitor or detect movements or positions of objects (e.g., a left side of the mouth 230 of the user 201) within, at, or along a second portion 295 of the head 203. In some embodiments, fewer or additional facial tracking devices 240 and 245 may be implemented depending upon particular applications.

In some embodiments, the first facial tracking device 240 is mounted to a first side of the wearable device 202 such that the first facial tracking device 240 is arranged to be positioned on a first side of a nose 231 of the user and the second facial tracking device 245 is mounted to a second side of the wearable device 202 such that the second facial tracking device 245 is arranged to be positioned on a second side of the nose 231. In this way, the facial tracking system may be able to monitor a greater amount of area of the head 203 of the user 201 without having obstructions from the nose 231 or other facial features.

The first facial tracking device 240 includes a first illuminator 110*a* and a first photon detector 111*a*. In some embodiments, the first facial tracking device 240 may include more than one illuminator 110*a* and/or more than one photon detector 111*a*. The first illuminator 110*a* is configured to project or emit a first light at least toward the first portion 290 and the first photon detector 111*a* is configured to receive light reflected from the first portion 290. The reflected first light may then be used to calculate, determine, or estimate a distance of objects within the first portion 290 from the first facial tracking device 240. For example, the reflected light is received by the photon detector 111*a* and the photon detector 111*a* generates a corresponding electrical signal that is indicative of the characteristics of the reflected light. In some embodiments, the electrical signal is indicative of the intensity of the light received (e.g., a higher current is generated by the photon detector in response to receiving a more intense light). The facial tracking system 204 (e.g., processing circuitry 102) may cross-reference within a database or use a formula that relates distance to the intensity of light received by the photon detector 111*a* to an estimated distance of objects within the first portion 290 from the first facial tracking device 240. In some embodiments, the database or formula may be unique to the type of illuminator 110*a* and photon detector 111*a* used and pre-stored within memory of the processing circuitry 102.

The second facial tracking device 245 also includes a second illuminator 110*b* and a second photon detector 111*b*. In some embodiments, the second facial tracking device 245 may include more than one illuminator 110*b* and/or more than one photon detector 111*b*. The second illuminator 110*b* is configured to project or emit a second light at least toward the second portion 295 and the second photon detector 111*b* is configured to receive light reflected from the second portion 295. The reflected second light may then be used to calculate, determine, or estimate a distance of objects within the second portion 295 from the second facial tracking device 245. For example, the reflected light is received by the second photon detector 111*b* and the photon detector 111*b* generates a corresponding electrical signal that is indicative of the characteristics of the reflected light. In some embodiments, the electrical signal is indicative of the intensity of the light received (e.g., a higher current is generated by the photon detector in response to receiving a more intense light). The facial tracking system 204 may cross-reference within a database or use a formula that relates distance to the intensity of light received by the second photon detector 111*b* to an estimated distance of objects within the second portion 295 from the second facial tracking device 245. In some embodiments, the database or formula may be unique to the type of illuminator 110*b* and photon detector 111*b* used and pre-stored within memory of the processing circuitry 102.

In some embodiments, the facial tracking system 204 also includes processing circuitry 102, an integrated circuit (IC), or an ASIC that is at least partially housed within the head mountable device 202. In some embodiments, the processing circuitry 102 also includes processors, memory, or machine readable medium that are located within auxiliary devices such as server systems, smartphones, personal computers, or devices that are supplementary to the head mountable device 202. The processing circuitry 102 is communicably coupled to and configured to control the facial tracking devices 240 and 245. For example, the processing circuitry 102 is communicably coupled to and configured to control the first illuminator 110*a* and the second illuminator 110*b* and is communicably coupled to and configured to receive data (raw data, processed data, conditioned data, or otherwise) from the first photon detector 111*a* and the second photon detector 111*b*.

Figure 3:
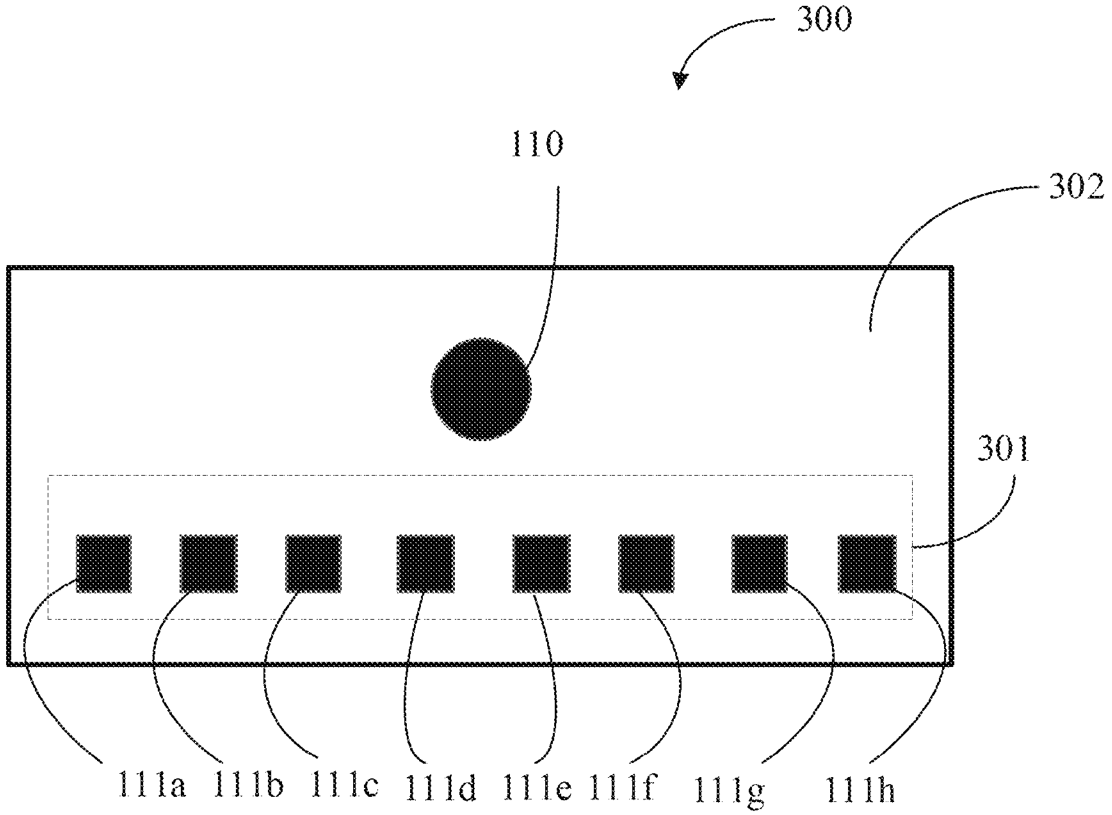
FIG. 3 depicts an example of a facial tracking device in accordance with an illustrative embodiment.
Figure 4:
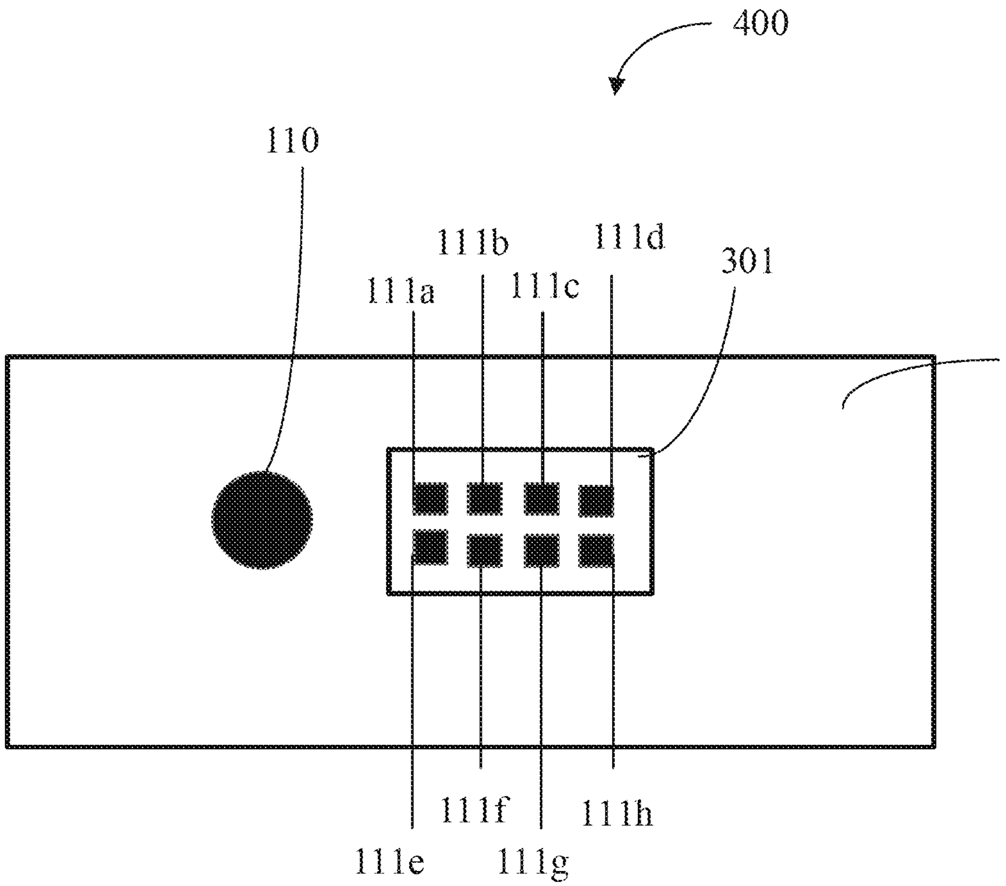
FIG. 4 depicts an example of a facial tracking device in accordance with an illustrative embodiment.

References to both FIGS. 3 and 4 are made in tandem for purposes of demonstration. FIG. 3 depicts an example of a facial tracking device 300. FIG. 4 depicts a second example of a facial tracking device 400 is shown. The examples of the facial tracking device 300 and 400 include an illuminator 110 and an array of detectors 301. In some embodiments, the illuminator 110 and the array of detectors 301 are mounted to or within a substrate 302. The substrate 302 may be a portion of a head mountable device (e.g., such as wearable device 202 as described in reference to FIG. 2). In some embodiments, the substrate 302 may be a rigid material such as a plastic, metal, composite, fiberglass, or a combination thereof that is configured to be mechanically affixed selectively or permanently to a respective device such as a head mountable device. In some embodiments, the substrate 302 may also have one or more portions of processing circuitry 102 mounted thereto or within.

The array of detectors 301 include multiple detectors 111*a-h* that enhance the resolution of the facial tracking device 300 or 400 to monitor or detect one or multiple objects within a respective area (e.g., such as the first portion 290 or the second portion 295 as described in reference to FIG. 2). For example, the illuminator 110 may be selectively controlled to project a light toward, over, or throughout a first area of a head of a user and each of the multiple detectors 111*a-h* are arranged and configured to receive portions of the light reflected from objects within respective portions of the first area. The light received by each of the multiple detectors 111*a-h* may then be processed or used to determine a landscape or facial expression of the first area.

The exact configuration of the array of detectors 301 (e.g., or number of multiple detectors 111*a-h* within the array of detectors 301) may depend upon the particular application or wearable device that the respective facial tracking device 300 or 400 is to be integrated with. For example, now referring to FIG. 3, in some embodiments, the multiple detectors 111*a-h* may be arranged linearly. In such an example, the multiple detectors 111*a-h* may allow for the facial tracking device 300 to monitor or detect positions of objects along an axis of a first area. In another example, now referring to FIG. 4, the multiple detectors 111*a-h* may be arranged along rows and columns. In such an example, the multiple detectors 111*a-h* may allow for the facial tracking device 400 to monitor or detect positions of objects along a first axis and a second axis of a first area.

In some embodiments, more than one illuminator 110 may be used with the array of detectors 301. In some embodiments, the multiple detectors 111*a-h* may include 2, 3, 4, 5, 6, 7, 8, 9, 10 or more detectors. In some embodiments, the multiple detectors 111*a-h* may be arranged in a circle, square, randomly, or any shape that allows for the multiple detectors 111*a-h* to enhance a resolution of a respective area. In some embodiments, each of the multiple detectors 111*a-h* may be configured to receive light reflected from a respective portion of an area where the respective portions do not overlap. In some embodiments, each of the multiple detectors 111*a-h* may be configured to receive light reflected from a respective portion of an area where one or more of the respective portions do overlap.

Figure 5:
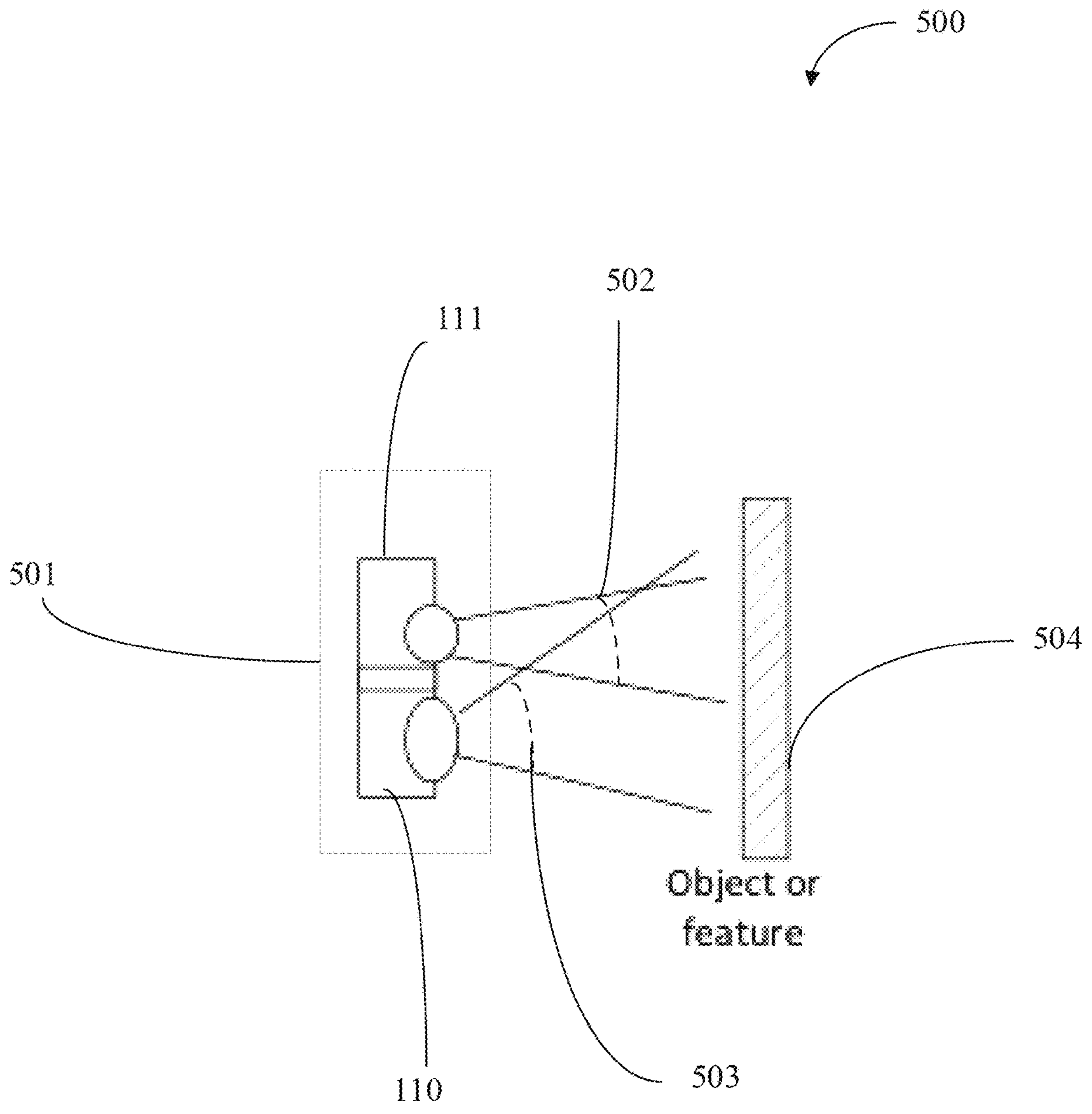
FIG. 5 depicts a diagram of a facial tracking device detecting an object in accordance with an illustrative embodiment.

Referring now to FIG. 5, a diagram 500 of a facial tracking device detecting an object is shown. The diagram 500 includes a facial tracking device 501 detecting or monitoring an object 504. The facial tracking device 501 includes an illuminator 110 and a photon detector 111. In some embodiments, the object 504 may include a facial feature such as a portion of the brow, mouth, nose, or chin of a user.

The illuminator 110 is configured to emit or project a light over a first area 503 of the object 504. The detector 111 is configured to receive portions of the light reflected from a second area 502 of the object. In some embodiments, the first area 503 and the second area 504 are the same. In some embodiments, the first area 503 is larger and includes the second area 504. The detector 111 may then receive the portions of the reflected light and the characteristics of the reflected light (e.g., phase, flight time, intensity, frequency, etc.) may then be used to determine a distance that the object within the second area 504 is from the facial tracking device 501 (e.g., the detector 111). In some embodiments, the facial tracking device 501 continuously or discretely in a periodic pre-determined frequency monitors or detects (e.g., projects and receives reflected light) the object within the second area 504. In some embodiments, multiple facial tracking devices are used to monitor multiple areas of the object 504. In some embodiments, the illuminator is configured to or controlled to emit the light at a pre-determined frequency (e.g., in an infrared frequency). The pre-determined frequency may be selected to reduce possible interference from other sources. For example, a pre-determined frequency in the infrared range may reduce the likelihood that other light (e.g., not from the illuminator) may interfere with the reflected light received by the photon detectors 111. In some embodiments, time division multiplexing may be used to reduce possible interference from more than one illuminators. As an example, when there are more than one illuminators, each illuminator may be turned on at a separate times in short bursts (e.g., a burst short enough in time such that a particular illuminator is not projecting light when its light is received by the photon detector) in order to reduce potential interference between the light from the more than one illuminators. In some embodiments, the time of flight between illumination and receiving the light at the photon detector may be used to calculate the distance of an object from the facial tracking device. In some embodiments, frequency division multiplexing may be used in order to reduce possible interference between light from other illuminators. For example, in some embodiments, each illuminator may be configured or controlled to project a light at a pre-determined frequency that is different than the other illuminators.

Figure 6:
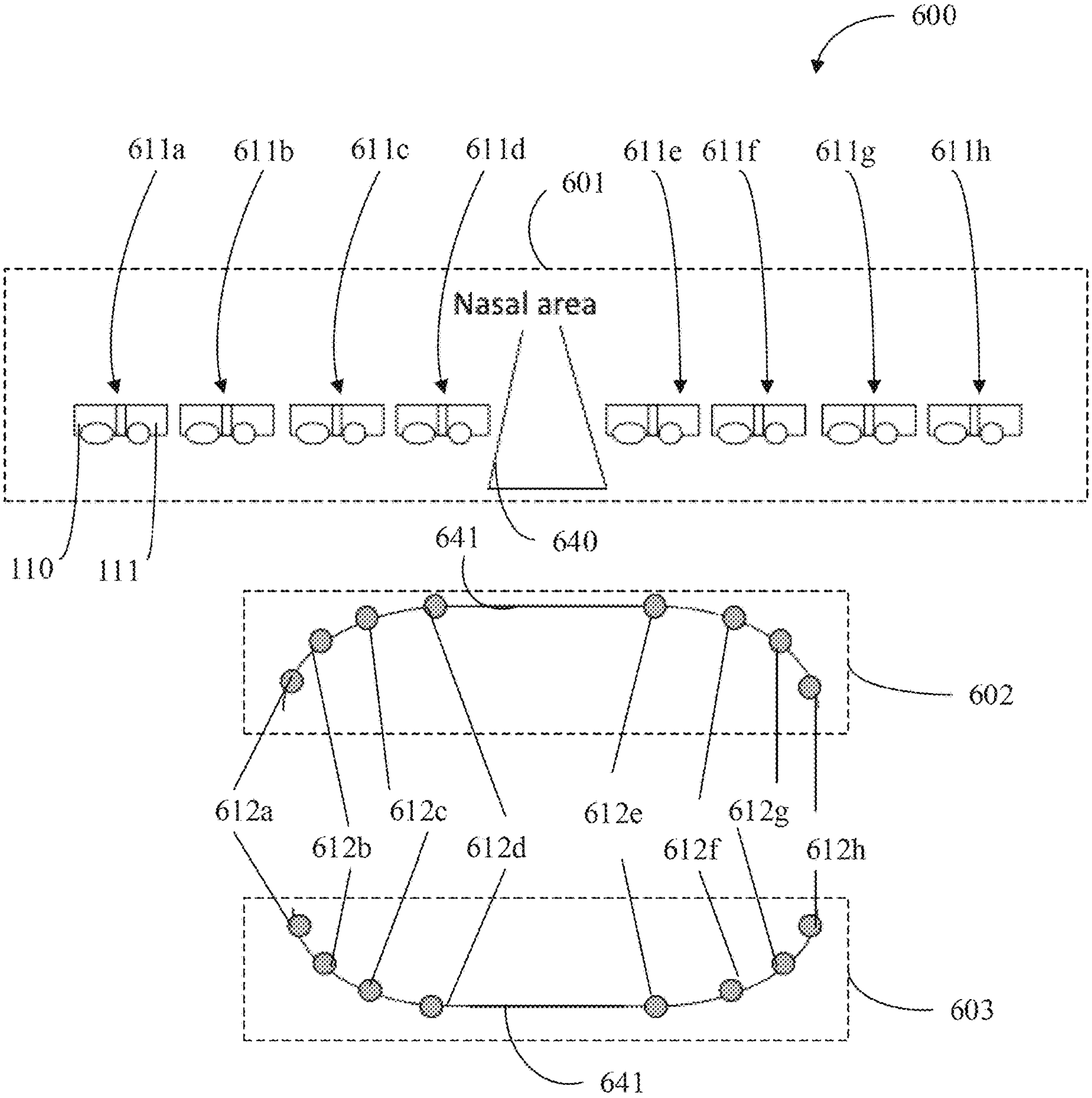
FIG. 6 depicts a diagram of a facial tracking system in accordance with an illustrative embodiment.

Referring now to FIG. 6, a diagram 600 of a facial tracking system is shown. The diagram 600 includes a facial tracking system 601, a first example of a facial expression determination 602, and a second example of a facial expression determination 603. The facial tracking system 601 includes multiple facial tracking devices 611*a-h*. A first set 611*a-d* of the multiple facial tracking devices are configured to be positioned (e.g., arranged on a substrate or head mountable device) on a first side (e.g., right side of a nose 640 of a user) of a head of a user and a second set 611*e-h* of the multiple facial tracking devices 611*a-h* are configured to be positioned on a second side of (e.g., left side of the nose 640) the head of the user.

Each of the multiple facial tracking devices 611*a-h* include an illuminator 110 and a photon detector 111 that are arranged and configured to monitor or detect a respective portion 612*a-h* of an object (e.g., a mouth 641 of a user). For example, a first facial tracking device 611*a* includes an illuminator 110 and a photon detector 111. The illuminator 110 of the first facial tracking device 611*a* is arranged to project light toward a first area of the object that includes a first portion 612*a* of the object (e.g., the mouth 641) and the photon detector 111 is arranged to receive light reflected from the first portion 612*a*. In this way, the multiple facial tracking devices 611*a-h* may be used to detect distances of the respective portions 612*a-h* of the object (e.g., a mouth 641).

The facial tracking device 601 may use the determined or detected distances of each portion 612*a-h* of the object to determine a facial expression of the user. That is, the facial tracking system 601 may map, interpolate, graph, or otherwise process the distances of each respective portion 612*a-h* to make a determination of a facial expression of the user. For example, the first facial detection device 611*a* detects that an outer portion (612*a*) of the mouth 641 is at a first distance and a fourth facial detection device 611*d* detects that a center portion (612*d*) is at a second distance.

In the first example of a facial expression determination 602, facial tracking system 601 maps out, interpolates, graphs, or otherwise constructs an image of the object (e.g., mouth 641) based on the measured distances of each respective portion 612*a-h* and determines that the user is frowning. In some embodiments, the facial tracking system 601 may determine that the user is frowning based at least on the first distance being larger than the second distance by a pre-determined threshold. In some embodiments, the pre-determined threshold may be 0.5, 0.75, 1, 1.5, 2 or more centimeters.

In the second example of a facial expression determination 603, facial tracking system 601 maps out, interpolates, graphs, or otherwise constructs an image of the object (e.g., mouth 641) based on the measured distances of each respective portion 612*a-h* and determines that the user is smiling. In some embodiments, the facial tracking system 601 may determine that the user is smiling based at least on the first distance being smaller than the second distance by a pre-determined threshold. In some embodiments, the pre-determined threshold may be 0.5, 0.75, 1, 1.5, 2 or more centimeters. In this way, the facial detection system 601 may monitor, detect, or determine a facial expression of a user without a camera or image processing, which reduces the amount of computational power needed.

Figure 7:
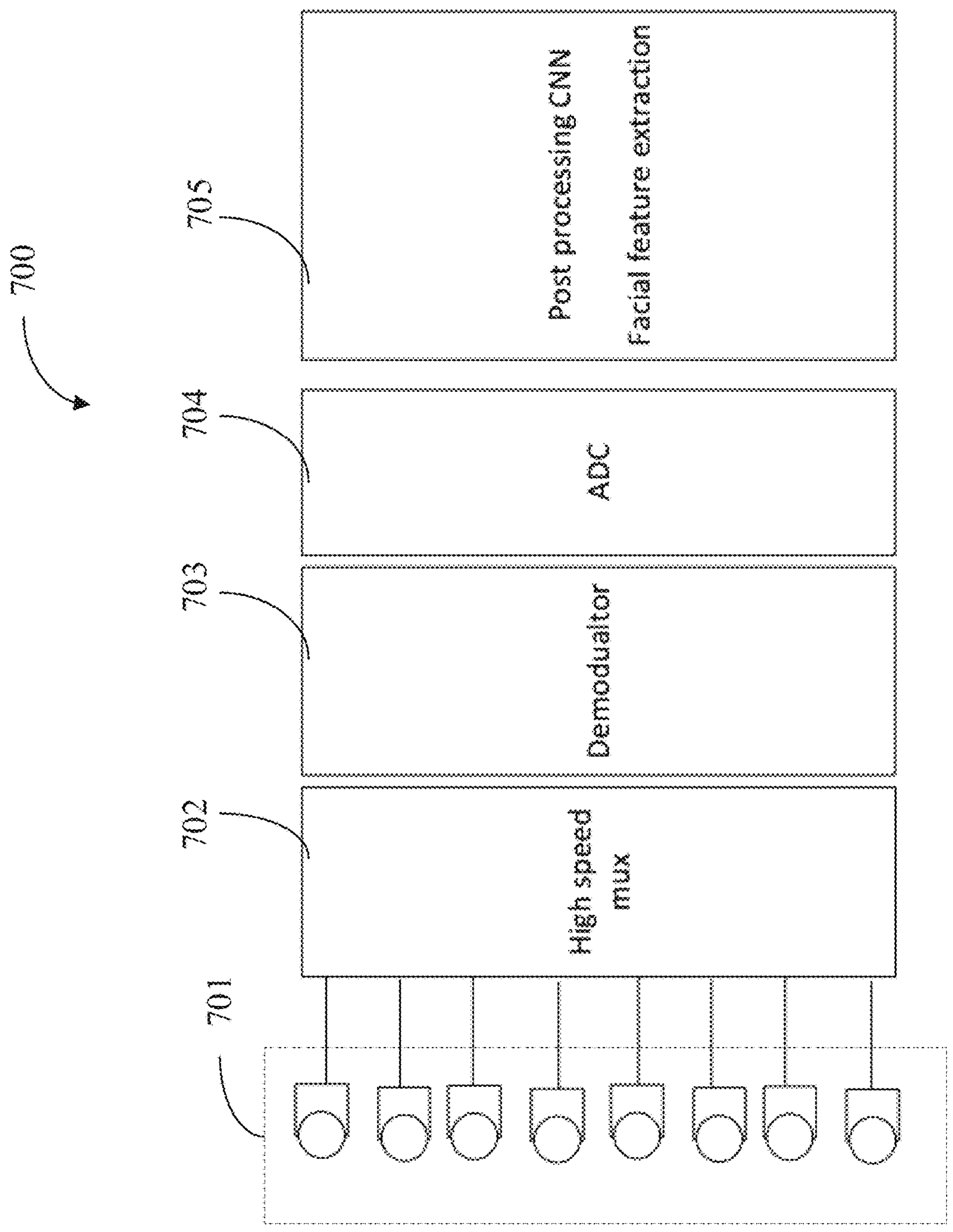
FIG. 7 depicts a block diagram of circuitry of a facial tracking system in accordance with an illustrative embodiment.

Referring now to FIG. 7, a block diagram 700 of circuitry of a facial tracking system is shown. The block diagram 700 includes an array of detectors 701, a multiplexer 702, a demodulator 703, an analog to digital converter (ADC) 704, and a processing block 705. The array of detectors 701 includes multiple photon detectors each connected to a respective terminal on the multiplexer 702. The multiplexer 702 may have a respective address for each of the multiple detectors such that a processor (e.g., at the processing block 705) may be able to determine which signals are associated with each of the multiple detectors. The demodulator 703 is connected to the multiplexer 702 and configured to demodulate the signals generated by each of the multiple detectors. The ADC 704 is configured to convert the demodulated signals from the demodulator 703 into digital representations of the demodulated signals. The ADC 704 is connected to the processor (e.g., at the processing block) that is configured to process the digital representations of the demodulated signals to determine a facial expression of a user of the facial tracking system. For example, the processor may use the digital representations of the demodulated signals to determine a profile of objects (e.g., based on the distance of the objects sensed from each of the multiple photon detectors) based on the distances sensed by the array of detectors 701. The processor may then determine based on the profile of the objects sensed by the array of detectors 702 the facial expression of the user (e.g., a smile, a frown, a scowl, a smirk, etc.).

Figure 8:
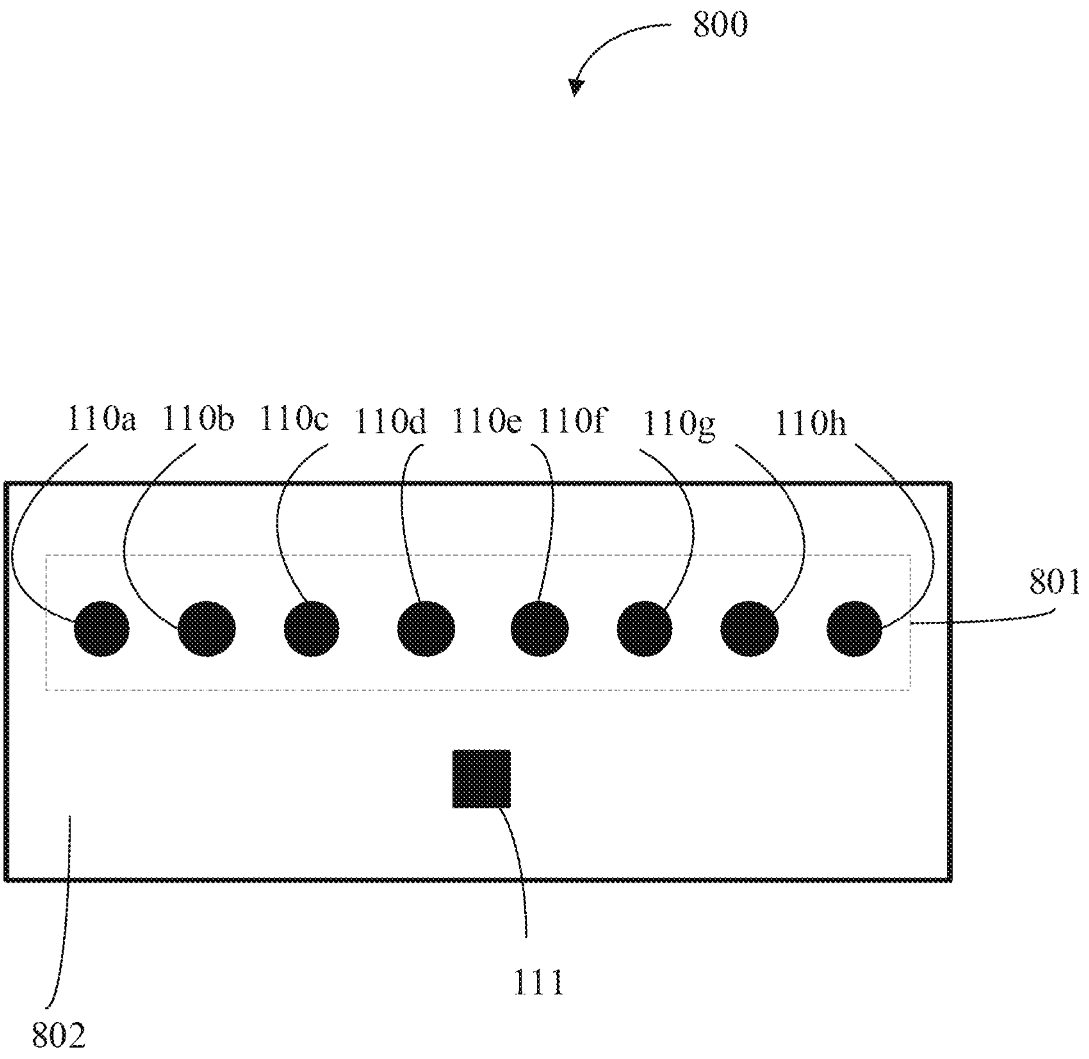
FIG. 8 depicts an example of a facial tracking device in accordance with an illustrative embodiment.
Figure 9:
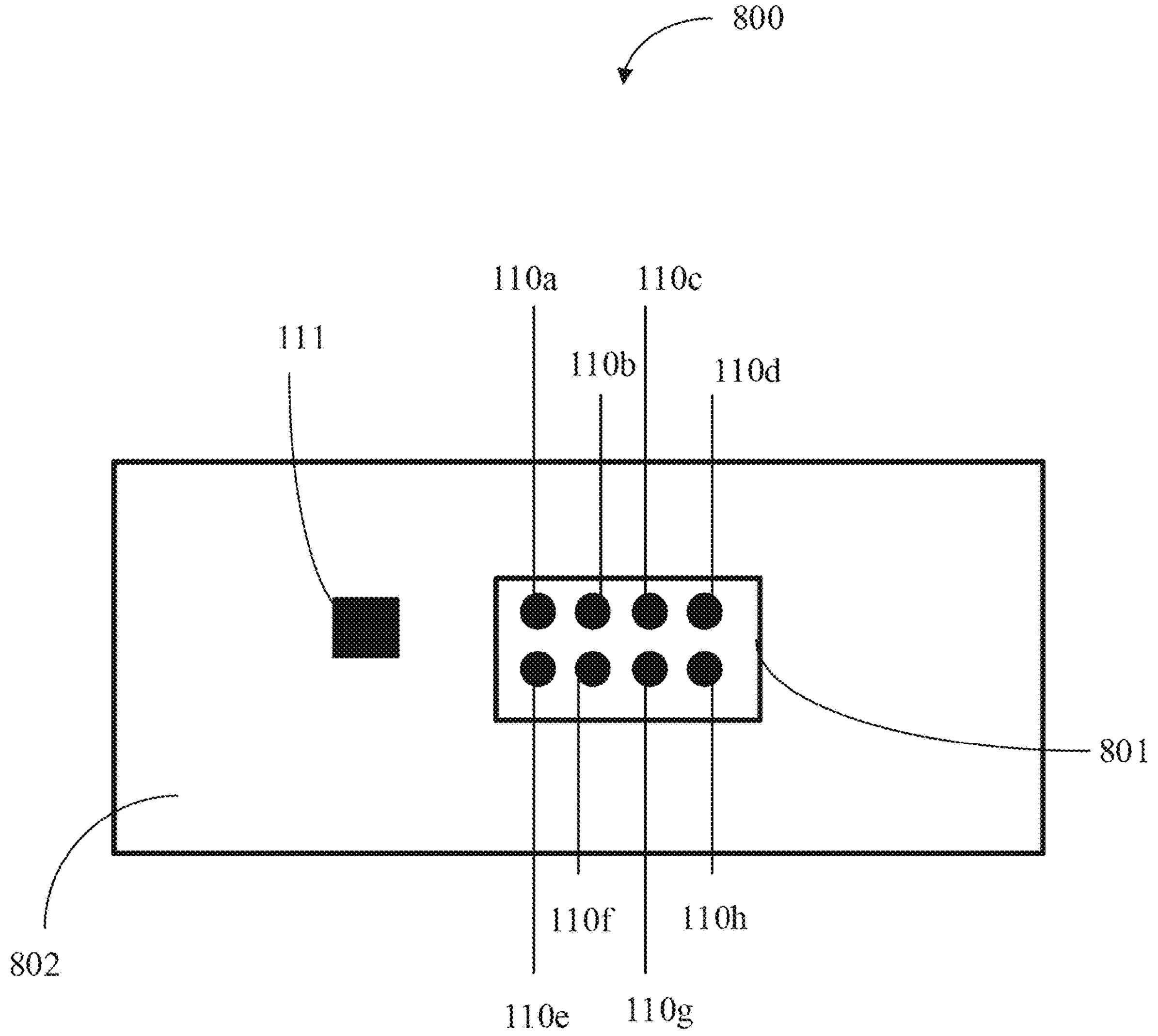
FIG. 9 depicts an example of a facial tracking device in accordance with an illustrative embodiment.

References to both FIGS. 8 and 9 are made in tandem for purposes of demonstration. FIG. 8 depicts a third example of a facial tracking device 800. FIG. 9 depicts a fourth example of a facial tracking device 900 is shown. The examples of the facial tracking device 800 and 900 include an array of illuminators 801 and a photon detector 111. In some embodiments, the array of illuminators 801 and photon detector 111 are mounted to or within a substrate 802. The substrate 802 may be a portion of a head mountable device (e.g., such as wearable device 202 as described in reference to FIG. 2). In some embodiments, the substrate 302 may be a rigid material such as a plastic, metal, composite, fiberglass, or a combination thereof that is configured to be mechanically affixed selectively or permanently to a respective device such as a head mountable device. In some embodiments, the substrate 802 may also have one or more portions of processing circuitry 102 mounted thereto or within.

The array of illuminators 801 include multiple illuminators 110*a-h* that are each spatially encoded or configured to emit spatially encoded light. The detector 111 is configured to receive light reflected from a first area of an object and each of the multiple illuminators 110*a*-h are configured to or arranged to project respective light toward respective portions of the first area of the object. In this way, the detector 111 receives light reflected from the first area that includes the spatially encoded light from at least some of the multiple illuminators 110*a-h*. Corresponding circuitry and/or processing circuitry connected to the detector 111 may then receive data indicative of light received by the detector 111 and determine a facial expression of a corresponding user. For example, each of the multiple illuminators 110*a-h* may be configured to or controlled by a processor to emit light that is spatially encoded toward respective portions of an area of an object. The processor may have stored in a database the respective portion that each of the multiple illuminators are arranged to project light toward. Thus, the processing circuitry may control each of the multiple illuminators 110*a-h* such that each of them emit a light having a unique characteristic (e.g., frequency, intensity, etc.). The processing circuitry may then determine which portions of the light received by the detector 111 belong to the respective multiple illuminators 110*a-h* based at least on the unique characteristics in order to determine a distance the respective portions of the objects based on the spatially encoded light.

The array of illuminators 801 allows the facial tracking devices 800 or 900 to be used to map, interpolate, graph, or construct an image of an object using multiple illuminators and at least one detector. In other words, the array of illuminators 801 may allow for enhanced resolution of the facial tracking devices 800 or 900 in monitoring, detecting, or determining a distance profile of a respective area (e.g., such as the first portion 290 or the second portion 295 as described in reference to FIG. 2). The exact configuration of the array of illuminators 801 (e.g., or number of multiple illuminators 110*a-h* within the array of illuminators 801) may depend upon the particular application or head mountable device that the respective facial tracking device 800 or 900 is to be integrated with. For example, now referring to FIG. 8, in some embodiments, the multiple illuminators 110*a-h* may be arranged linearly. In such an example, the multiple illuminators 110*a-h* may allow for the facial tracking device 800 to monitor or detect positions of objects along an axis of a first area. In another example, now referring to FIG. 9, the multiple illuminators 110*a-h* may be arranged along rows and columns. In such an example, the multiple illuminators 110*a-h* may allow for the facial tracking device 900 to monitor or detect positions of objects along a first axis and a second axis of a first area.

In some embodiments, more than one detector 111 may be used with the array of illuminators 801. In some embodiments, the multiple illuminators 110*a-h* may include 2, 3, 4, 5, 6, 7, 8, 9, 10 or more illuminators. In some embodiments, each of the multiple illuminators 110*a-h* may be configured to project spatially encoded light toward respective portions of a first area where the respective portions do not overlap. In some embodiments, each of the multiple illuminators 110*a-h* may be configured to project spatially encoded light toward respective portions of a first area where one or more of the respective portions do overlap. In some embodiments, the respective portions are pre-determined or pre-measured and stored within a database.

Figure 10:
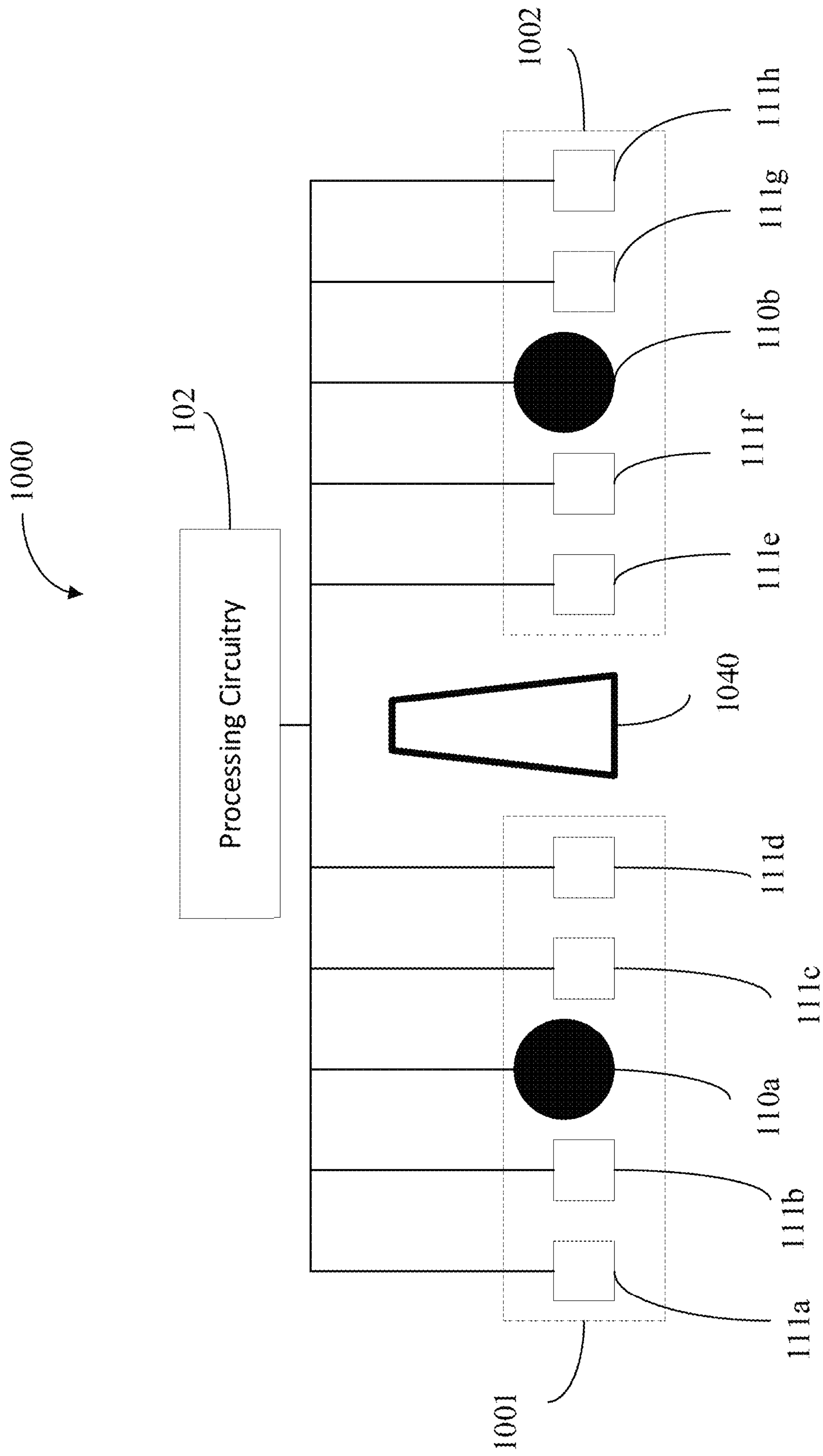
FIG. 10 depicts a diagram of a facial tracking system in accordance with an illustrative embodiment.

Referring now to FIG. 10, a diagram of a facial tracking system 1000 is shown. The facial tracking system 1000 includes a first facial tracking device 1001 and a second facial tracking device 1002 both communicably coupled to processing circuitry 102. The first facial tracking device 1001 is configured to be positioned (e.g., arranged on a substrate or head mountable device) on a first side (e.g., right side of a nose 1040 of a user) of a head of a user and the second facial tracking device 1002 is configured to be positioned on a second side of (e.g., left side of the nose 1040) the head of the user.

The first facial tracking device 1001 includes a first illuminator 110*a* and a first set of detectors 111*a-d*. The first illuminator 110*a* is arranged and controlled by the processing circuitry 102 to project a light onto a first area of a head of a user. For example, the first area may include a right side of a mouth of the user. Each of the first set of detectors 111*a-d* are arranged to receive light reflected from respective portions of the first area. For example, a first detector 111*a* may be arranged to receive light reflected from a first portion of the first area that corresponds to an outer edge of a mouth of the user (e.g., an outer right edge of lips or mouth), a second detector 111*b* may be arranged to receive light reflected from a second portion of the first area that corresponds to a position of the mouth more center than the first portion, and a fourth detector 111*d* may be arranged to receive light reflected from a position that is near the center of the mouth (e.g., and/or near the center of the mouth on the same side of the mouth as the first portion). The second facial tracking device 1002 includes a second illuminator 110*b* and a second set of detectors 111*e-h*. The second illuminator 1002 and the second set of detectors 111*e-h* may be arranged and configured to perform similar but symmetric operations on a second area of the head. For example, the second area may include the left side of the mouth.

Each of the detectors 111*a-h* are configured to receive light from reflected portions of a head in some embodiments. The exact position and or arrangements of each detector 111*a-h* and corresponding portions of the head may be known or determined and stored within a database.

Figure 11:
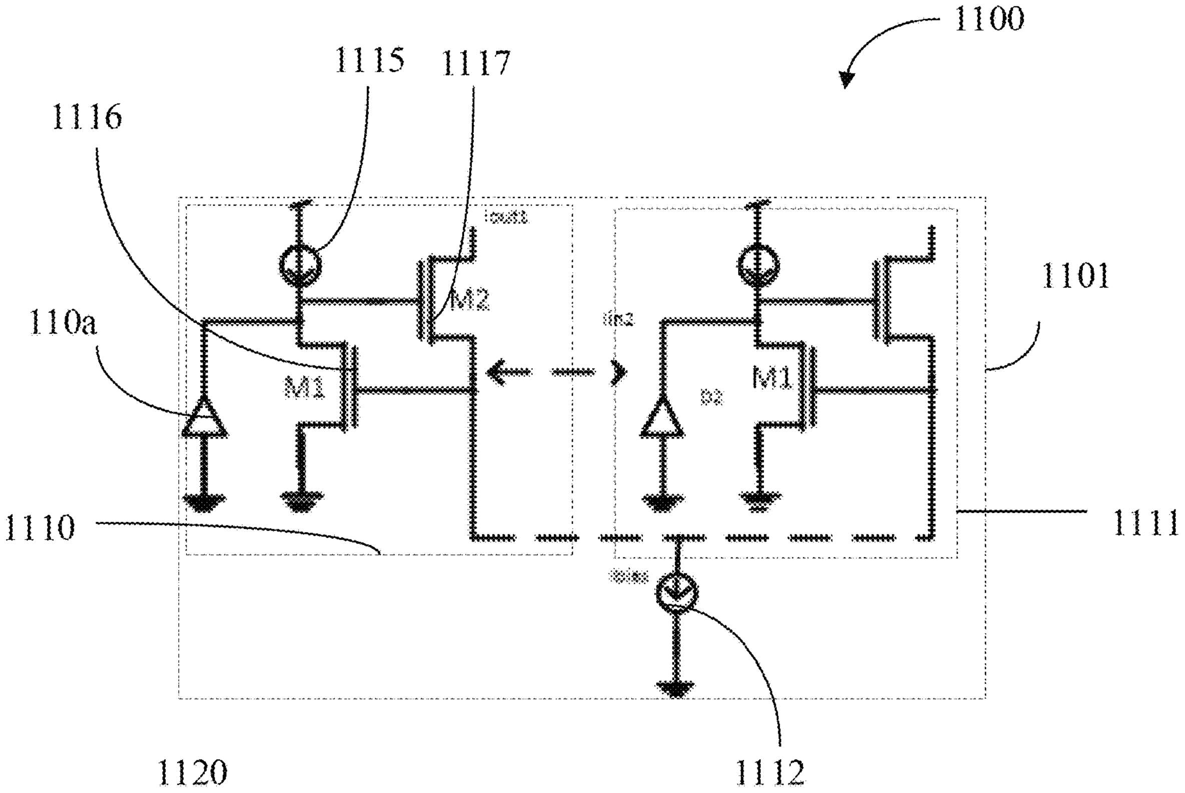
FIG. 11 depicts a schematic diagram of a winner take all circuit and example outputs in accordance with an illustrative embodiment.

Referring now to FIG. 11, a schematic diagram 1100 of a winner take all circuit 1101 and example outputs are shown. In some embodiments, a facial tracking system such as the facial tracking system 1000 described in reference to FIG. 10 may determine a facial expression of a user in the analog domain. For example, a facial tracking system may use a winner take all circuit or similar circuit to determine a facial expression of a user based on an output of the circuit.

The schematic diagram 1100 includes a winner take all circuit 1101. The winner take all circuit 1101 includes a first branch 1110 and a second branch 1111 each connected to a bias current source 1112. In some embodiments, the winner take all circuit 1101 has as a branch for each one of the detectors 111 of a corresponding facial tracking device. Each branch includes a corresponding detector 110*a*, a current source 1115, a first transistor 1116, and a second transistor 1117. An output of the current source 1115 is connected to an output of the detector 110*a* and a first terminal of the first transistor 1116. A second terminal of the first transistor 1116 is connected to ground. A control terminal (e.g., gate terminal) of the first transistor 1116 is connected to a first terminal of the second transistor 1117 and to an input terminal of the bias current source 1112. A control terminal (e.g., a gate terminal of the second transistor 1117 is connected to the first terminal of the first transistor 1116. A second terminal of the second transistor 1117 is connected to a processor of the processing circuitry 102. In some embodiments, the second terminal of the second transistor 1117 is connected to a respective input of a multiplexer or other address specific device.

The winner take all circuit 1101 is configured to signal to the processor a detector that has the highest or most intense signal. The processing circuitry may then determine a facial expression of the user based on which of the branches (e.g., and corresponding detector) has the highest or most intense signal. For example, the highest or most intense signal may indicate that the respective detector has an object closer to the respective detector than any other of the diodes. Thus, referring now back to FIG. 10, if a branch that corresponds to the first diode 111*a* is outputting the signal, the processing circuitry may determine that the portion corresponding to the first diode 111*a* (e.g., the outer edge of the mouth) has the smallest distance. The processor may then determine that the facial expression of the user is a smile (e.g., because the outer edge of the mouth is higher or closer to the detectors than the center of the mouth.).

In some embodiments, each facial tracking device may be connected to a corresponding winner take all circuit 1101. In some embodiments, two or more of the facial tracking devices may be connected to a corresponding winner take all circuit 1101. The outputs of the winner take all circuits 1101 may be connected to a processor directly or via circuitry such as a multiplexer. The multiplexer may be configured to signal to the processing circuitry an address of the branch or branches that are outputting a signal. The processing circuitry may cross reference the address or branch location within a database to determine which position on the head that the address corresponds to and determine the facial expression based on the corresponding position of the head. For example, if a branch corresponding to the detectors 111*d* on one winner take all circuit is outputting a signal and a branch corresponding to the detector 111*e* on another winner take all circuit is outputting a signal, then the processor may determine that the facial expression of the user is a frown.

Figure 12:
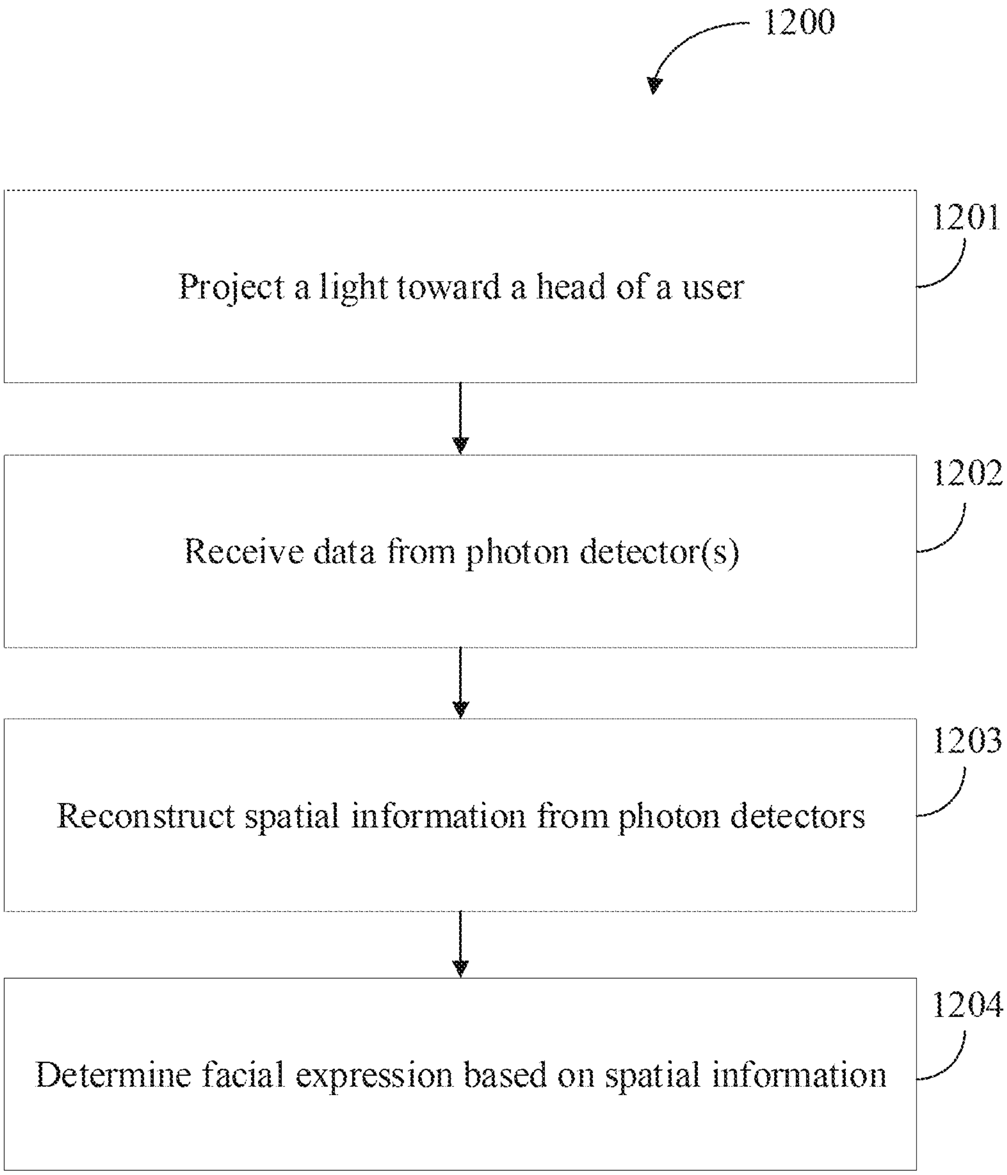
FIG. 12 depicts a flow diagram of a method of facial tracking in accordance with an illustrative embodiment.

Referring now to FIG. 12, a flow diagram 1200 of a method of facial tracking is shown. In operation 1201, the facial tracking system projects light, using an illuminator, toward a face of a user. In some embodiments, a processor connected to the one or more illuminators causes the one or more illuminators to each project a light. In some embodiments, the facial tracking system causes the one or more illuminators to each project a light toward respective portions of a head (e.g., face or mouth) of a user). In some embodiments, the facial tracking system causes each of the illuminators to project spatially encoded light toward respective portions of the head. In some embodiments, the facial tracking system causes each of the one or more illuminators to project light having the same characteristics toward respective portions of the head. In some embodiments, the respective portions may overlap with one another. In some embodiments, the respective portions may not overlap with another.

In operation 1202, the facial tracking system receives data indicative of received light from one or more photon detectors. That is, the light reflected from the respective portions of the head is received by one or more photon detectors and the detectors generate electrical signals indicative of the received light. In some embodiments, the electrical signals are received by a winner take all circuit and the winner take all circuit outputs a signal to the processor. In some embodiments, the electrical signals are converted into digital form (e.g., via an ADC) and received by the processing circuitry. In some embodiments, additional processing of the electrical signals via analog and/or digital circuitry may occur before the electrical signals are received by the processing circuitry.

In operation 1203, the facial tracking system reconstructs spatial information based on the data of the one or more photon detectors. That is, the processing circuitry reconstructs a profile of the face based on the electrical signals. The electrical signals are reconstructed to create the profile of the face. In some embodiments, such as when the processing circuitry receives a signal from a winner take all circuit, the processor determines which portion of the face is closest or nearest to a particular detector (e.g., based on an address of the signal associated with the particular detector). The processing circuitry then may cross reference within a database the particular detector (e.g., the address) with a location and a respective portion of the face that the particular detector is positioned to receive light from. In this way, the processing circuitry may reconstruct the profile of the face based on the signal.

In some embodiments, the facial tracking system may determine a distance of objects sensed by each of the detectors using the electrical signals. The distance of objects sensed by each of the detectors may be determined based on the intensity (e.g., intensity or magnitude of current) generated by the photon detector. The intensity or magnitude of the signal (e.g., current) generated by each of the photon detectors may then be cross-referenced or used within a formula of known intensities or magnitudes of the signal versus a distance of the object from the photon detector in order to determine the distances. The processing circuitry may then use the distances, known address of each of the detectors, and the known respective portions of the head that each of the detectors are configured to receive reflected light from to create a profile of the face. In some embodiments, the facial tracking system may receive a signal from a photon detector that includes received light from a portion of the head and reconstruct the profile of the face based on the characteristics of the light received by the photon detector (e.g., and encoded within the signal). For example, in an embodiment where multiple illuminators are used, each being configured to project spatially encoded light toward respective portions of the face, the photon detector may output a signal encoded with information of each spatially encoded light received by the photon detector and the processing circuitry may reconstruct a profile based on the signal and known characteristics and positioning of the spatially encoded light.

In operation 1204, the facial tracking system determines a facial expression based on the reconstructed spatial information. In some embodiments, the processing circuitry uses the reconstructed profile to determine a facial expression on the face of the user. For example, in some embodiments, the profile may be a profile of a mouth of the user and the processing circuitry may determine that the profile indicates that the user is smiling, scowling, frowning, or smirking. In some embodiments, the profile bay be a profile of a brow or forehead of the user and the profile may indicate that the user is expressing a worried look, or an angry look based on the profile of the brow.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to “an implementation,” “some implementations,” “one implementation” or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to “approximately,” “about” “substantially” or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term “coupled” and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References to “or” can be construed as inclusive so that any terms described using “or” can indicate any of a single, more than one, and all of the described terms. A reference to “at least one of ‘A’ and ‘B’” can include only ‘A’, only ‘B’, as well as both ‘A’ and ‘B’. Such references used in conjunction with “comprising” or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., “top,” “bottom,” “above,” “below”) are merely used to describe the orientation of various elements in the FIGURES. The orientation of various elements may differ according to other exemplary embodiments, and that such variations are intended to be encompassed by the present disclosure.

What is claimed is:

1. A head wearable display (HWD) comprising:

an element configured to be worn on a head of a user;

a first illuminator disposed with the element and configured to emit first light toward at least a first portion of the head;

a second illuminator disposed with the element and configured to emit second light toward at least a second portion of the head;

a first photon detector disposed with the element without contacting at least the first portion of the head and configured to receive the first light reflected from at least the first portion of the head;

a second photon detector disposed with the element without contacting at least the second portion of the head and configured to receive the second light reflected from at least the second portion of the head;

one or more processors coupled to a non-transitory computer-readable storage medium having instructions encoded thereon that, when executed by the one or more processors, cause the one or more processors to:

determine a facial expression of the user based at least on a first distance to at least the first portion determined using the first light from the first photon detector and a second distance to at least the second portion determined using the second light from the second photon detector.

2. The HWD of claim 1, wherein the first portion of the head and the second portion of the head overlap at least partially.

3. The HWD of claim 1, further comprising additional photon detectors arranged in an array and configured to receive light reflected from respective portions of the head.

4. The HWD of claim 3, wherein to determine the facial expression, the non-transitory computer-readable storage medium having instructions encoded thereon that, when executed by the one or more processors, cause the one or more processors to further receive information from each of the additional photon detectors.

5. The HWD of claim 1, further comprising additional illuminators, wherein additional photon detectors are arranged in an array and each of the additional illuminators configured to emit light with spatially encoded characteristics toward respective portions of the head.

6. The HWD of claim 5, wherein the first photon detector provides characteristics of the first, and wherein the element is a glass frame or a housing.

7. The HWD of claim 6, wherein the first and second portions of the head are on one side of a nose of the user.

8. A facial tracking device comprising:

an illuminator configured to emit light toward a face of a user;

a first photon detector disposed with an element without contacting at least a first portion of a head and configured to receive first light reflected from at least a first portion of the head;

a second photon detector disposed with the element without contacting at least a second portion of the head and configured to receive second light reflected from at least a second portion of the head; and a processor coupled to a non-transitory computer-readable storage medium having instructions encoded thereon that, when executed by the processor, cause the processor to:

determine a facial expression of the user based at least on a first distance to at least the first portion of the head determined using the first light from the first photon detector and a second distance to at least the second portion of the head determined using the second light from the second photon detector.

9. The facial tracking device of claim 8, further comprising circuitry configured to indicate the facial expression of the face based on characteristics received by the first photon detector and the second photon detector.

10. The facial tracking device of claim 9, wherein the circuitry comprises a winner take all circuit configured to output a signal to the processor that is indicative of the facial expression of the face to the processor.

11. The facial tracking device of claim 8, further comprising more photon detectors, wherein the more photon detectors are arranged in an array and configured to receive light reflected from respective portions of the head.

12. The facial tracking device of claim 11, wherein the respective portions of the head are all located on a first side of a nose of the face, and wherein the facial tracking device further comprises:

a second illuminator emit light toward at least a portion of a second side of the face;

a second set of more photon detectors, wherein the second set is arranged in a second array and configured to receive light reflected from respective portions of the second side of the face.

13. The facial tracking device of claim 12, wherein to determine the facial expression the processor is further configured to receive information regarding characteristics of the light from the more photon detectors and the second set of the more photon detectors.

14. The facial tracking device of claim 8, wherein the first portion of the head and the second portion of the head overlap at least partially.

15. The facial tracking device of claim 8, wherein characteristics of the light of the illuminator are spatially encoded corresponding to a face of the user.

16. A method of tracking a facial expression of a user comprising:

projecting light using an illuminator of a facial tracking system toward a face of a user;

receiving, via the facial tracking system, information from a first photon detector and information from a second photon detector, the information comprising characteristics of the light reflected from the face; and determining, via the facial tracking system, a facial expression of the face based on a first distance to at least a first portion of the face determined using first light reflected from the face and a second distance to at least a second portion of the face determined using second reflected from the face.

17. The method of claim 16, wherein turning on the illuminator further comprises turning on multiple illuminators of the facial tracking system such that each of the multiple illuminators project a light having different characteristics toward respective portions of the face.

18. The method of claim 17, wherein the determining the facial expression further comprises reconstructing an image of at least a portion of the face based on the information.

19. The method of claim 16, further comprising:

receiving, via the facial tracking system, information from multiple photon detectors, wherein each of the multiple photon detectors are configured to receive light from respective portions of the face.

20. The method of claim 19, wherein the determining the facial expression further comprises reconstructing an image of at least a portion of the face based on the information from the multiple photon detectors.

* * * * *